United States Patent
Chan et al.

(10) Patent No.: US 9,946,634 B2
(45) Date of Patent: Apr. 17, 2018

(54) SYSTEM AND METHOD FOR DETERMINING TEST COVERAGE

(71) Applicant: International Business Machines Corporation, Armonk, NY (US)

(72) Inventors: Philip S. P. Chan, Marrickville (AU); Laurence A. Hey, Manly (AU); William J. Izard, Sydney (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 14/100,409

(22) Filed: Dec. 9, 2013

(65) Prior Publication Data

US 2015/0161028 A1  Jun. 11, 2015

(51) Int. Cl.
| | | |
|---|---|---|
| G06F 9/44 | (2006.01) | |
| G06F 11/36 | (2006.01) | |
| G06F 9/45 | (2006.01) | |
| G06F 9/445 | (2018.01) | |

(52) U.S. Cl.
CPC .......... G06F 11/3676 (2013.01); G06F 8/49 (2013.01); G06F 8/70 (2013.01); G06F 11/3688 (2013.01); G06F 8/40 (2013.01); G06F 8/433 (2013.01); G06F 8/63 (2013.01); G06F 9/44521 (2013.01)

(58) Field of Classification Search
CPC .. G06F 9/4843; G06F 9/3851; G06F 9/44568; G06F 11/3676; G06F 11/3688; G06F 8/40; G06F 8/63; G06F 9/44521; F06F 8/49; F06F 8/70; F06F 8/466
See application file for complete search history.

(56) References Cited

U.S. PATENT DOCUMENTS

| | | | |
|---|---|---|---|
| 5,784,553 A * | 7/1998 | Kolawa et al. | 714/38.1 |
| 6,721,941 B1 * | 4/2004 | Morshed | G06F 11/3612 709/217 |
| 7,240,335 B2 | 7/2007 | Angel et al. | |
| 7,926,042 B2 | 4/2011 | Mehta et al. | |
| 2010/0146340 A1 * | 6/2010 | Bhate et al. | 714/38 |
| 2012/0167057 A1 | 6/2012 | Schmich et al. | |

(Continued)

OTHER PUBLICATIONS

Binder et al., "Advanced Java Bytecode Instrumentation," http://www.inf.usi.ch/faculty/binder/documents/pppj07.pdf, downloaded Nov. 25, 2013, pp. 1-10;

(Continued)

*Primary Examiner* — Camquy Truong
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and system is provided for determining test coverage. In an implementation, a method may include identifying at least one change in source code. The method may also include instrumenting object code of at least one class file associated with a source file of the source code associated with the identified at least one change. The method may further include testing the instrumented object code with at least one test case. The method may further include generating a coverage report associated with the instrumented object code, wherein the coverage report includes a proportion of the at least one change in the source code covered by the at least one test case.

10 Claims, 3 Drawing Sheets

(56) References Cited

U.S. PATENT DOCUMENTS

| | | | |
|---|---|---|---|
| 2012/0317551 A1* | 12/2012 | Hecht et al. | 717/128 |
| 2013/0024846 A1* | 1/2013 | Lewis et al. | 717/130 |
| 2013/0055214 A1* | 2/2013 | Harrison | G06F 11/3676 |
| | | | 717/127 |
| 2014/0096115 A1* | 4/2014 | Guan et al. | 717/140 |

OTHER PUBLICATIONS

Caserta et al., "JBInsTrace: A tracer of Java and JRE classes at basic-block granularity by dynamically instrumenting bytecode," http://ww.loria.fr/~casertap/articlles/JBInsTrace_A_of_Java_and_JRE_Classes%28EST%29.pdf, downloaded Nov. 25, 2013, pp. 1-10.

"The Class File Format," The Java Virtual Machine Specification, http://docs.oracle.com/javase/specs/jvmse5.0/html/Classfile.doc.html#79868)[Aug. 29, 2013 3:29:08 PM] downloaded on Aug. 29, 2013, pp. 1-41.

"The Class File Format," The Java Virtual Machine Specification, http://docs.oracle.com/javase/specs/jvmsse5.0/html/Classfile.doc.html#22856)[Aug. 29, 2013 3:31:56 PM] downloaded on Aug. 29, 2013, pp. 1-41.

* cited by examiner

SYSTEM AND METHOD FOR DETERMINING TEST COVERAGE

TECHNICAL FIELD

The present disclosure generally relates to determining test coverage, and more particularly relates to systems and methods for determining test coverage of changed code.

BACKGROUND

Code coverage tools and test coverage tools may be used to determine what source code of a software product or application is being executed and if the executed source code is being properly and thoroughly tested. Developers may generate test cases to test whether a software product or application is functioning as it should and whether all of the features of the software product or application are also functioning as expected.

SUMMARY OF DISCLOSURE

According to an implementation, a computer-implemented method may include identifying at least one change in source code. The method may also include instrumenting object code of at least one class file associated with a source file of the source code associated with the identified at least one change. The method may further include testing the instrumented object code with at least one test case. The method may further include generating a coverage report associated with the instrumented object code, wherein the coverage report may include a proportion of the at least one change in the source code covered by the at least one test case.

One or more of the following features may be included. Identifying the at least one change in the source code may include identifying the at least one change in the source code based upon, at least in part, a source code history change-set. The at least one change in the source code may include at least one of a new source file and at least one change in an existing source file.

The method may further include identifying the at least one class file associated with the source file of the source code associated with the at least one change based upon, at least in part, a source code attribute of the at least one class file.

Instrumenting the object code of the at least one class file associated with the source file of the source code associated with the identified at least one change may include instrumenting the object code associated with the at least one class file associated with the new source file.

Instrumenting the object code of the at least one class file associated with the source file of the source code associated with the identified at least one change may include instrumenting the object code associated with the at least one class file associated with the at least one change in the existing source file.

Instrumenting the object code of the at least one class file associated with the source file of the source code associated with the identified at least one change may include inserting a counter into the object code of the at least one class file associated with the source file of the source code associated with the identified at least one change.

According to another implementation, a computer program product includes a computer readable medium having a plurality of instructions stored on it. When executed by a processor, the instructions may cause the processor to perform operations including identifying at least one change in source code. Instructions may also be included for instrumenting object code of at least one class file associated with a source file of the source code associated with the identified at least one change. Instructions may also be included for testing the instrumented object code with at least one test case. Instructions may also be included for generating a coverage report associated with the instrumented object code, wherein the coverage report may include a proportion of the at least one change in the source code covered by the at least one test case.

One or more of the following features may be included. Instructions for identifying the at least one change in the source code may include identifying the at least one change in the source code based upon, at least in part, a source code history change-set. The at least one change in the source code may include at least one of a new source file and at least one change in an existing source file.

Instructions may be included for identifying the at least one class file associated with the source file of the source code associated with the at least one change based upon, at least in part, a source code attribute of the at least one class file.

Instructions for instrumenting the object code of the at least one class file associated with the source file of the source code associated with the identified at least one change may include instrumenting the object code associated with the at least one class file associated with the new source file.

Instructions for instrumenting the object code of the at least one class file associated with the source file of the source code associated with the identified at least one change may include instrumenting the object code associated with the at least one class file associated with the at least one change in the existing source file.

Instructions for instrumenting the object code of the at least one class file associated with the source file of the source code associated with the identified at least one change may include inserting a counter into the object code of the at least one class file associated with the source file of the source code associated with the identified at least one change.

According to another implementation, a system may include at least one processor device and at least one memory architecture coupled with the at least one processor device. The at least one processor device may be configured for identifying at least one change in source code. The at least one processor may also be configured for instrumenting object code of at least one class file associated with a source file of the source code associated with the identified at least one change. The at least one processor may further be configured for testing the instrumented object code with at least one test case. The at least one processor may further be configured for generating a coverage report associated with the instrumented object code, wherein the coverage report may include a proportion of the at least one change in the source code covered by the at least one test case.

One or more of the following features may be included. Identifying the at least one change in the source code may include identifying the at least one change in the source code based upon, at least in part, a source code history change-set. The at least one change in the source code may include at least one of a new source file and at least one change in an existing source file.

The at least one processor may further be configured for identifying the at least one class file associated with the source file of the source code associated with the at least one change based upon, at least in part, a source code attribute of the at least one class file.

Instrumenting the object code of the at least one class file associated with the source file of the source code associated with the identified at least one change may include instrumenting the object code associated with the at least one class file associated with the new source file.

Instrumenting the object code of the at least one class file associated with the source file of the source code associated with the identified at least one change may include instrumenting the object code associated with the at least one class file associated with the at least one change in the existing source file.

Instrumenting the object code of the at least one class file associated with the source file of the source code associated with the identified at least one change may include inserting a counter into the object code of the at least one class file associated with the source file of the source code associated with the identified at least one change.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Source code of a software product may be compiled into a series of instructions that may be interpreted by a computer. Code coverage tools may be used to determine which parts of the source code are being executed. Each line of source code may map to one or more machine-readable instructions that may be interpreted by the computer. Instrumentation of code may increase the number of machine-readable instructions, therefore instrumenting the whole software product or application may cause significant lag time while testing the software product or application. In some embodiments consistent with the present disclosure, lines of source code that have changed may be automatically identified using a source code control history such that the object code corresponding to the changes in software code may be instrumented and tested.

Figure 1:
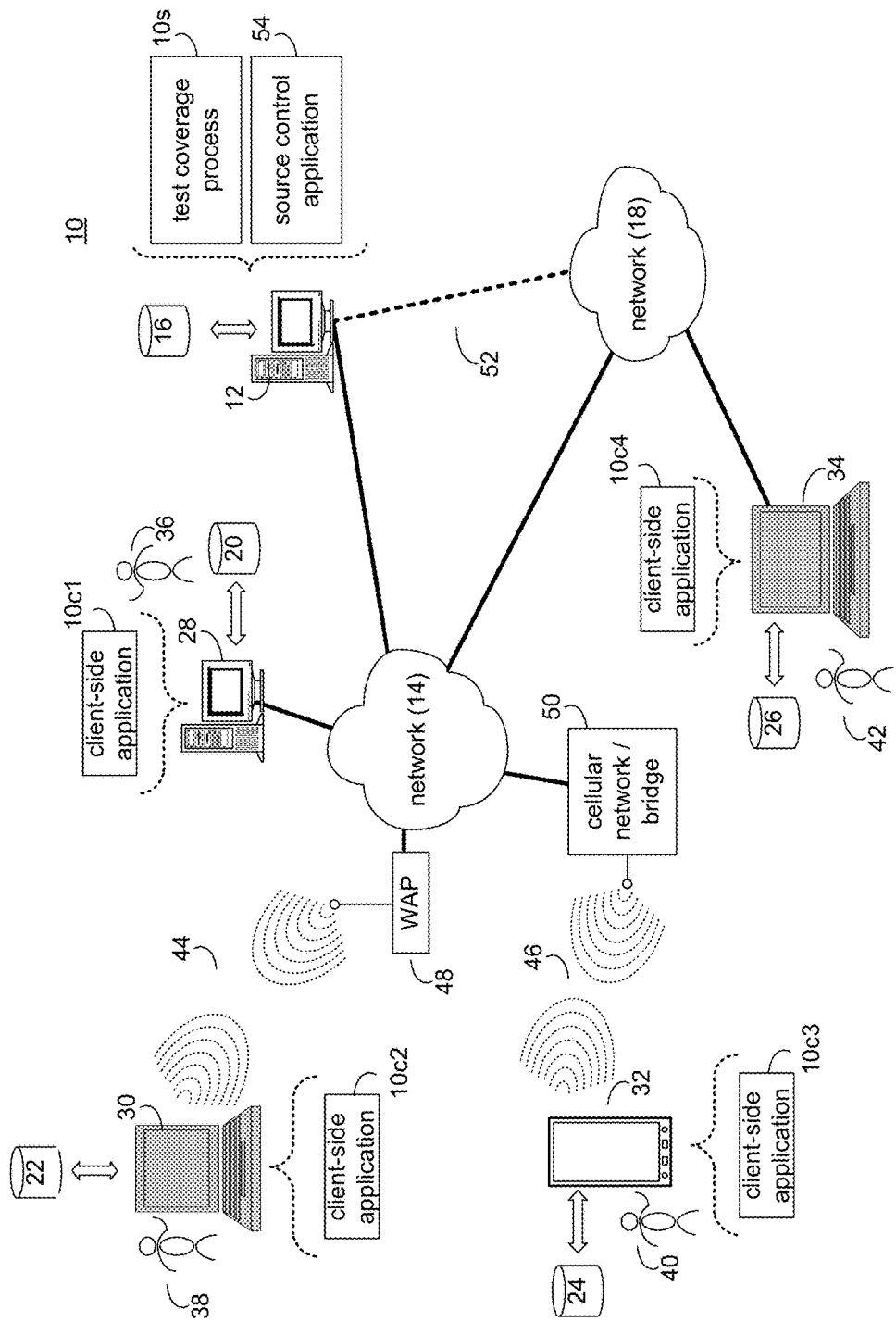
FIG. 1 is a diagrammatic view of a distributed computing network including a computing device that executes a test coverage process according to an implementation of the present disclosure.

Referring to FIG. 1, there is shown test coverage process 10. For the following discussion, it is intended to be understood that test coverage process 10 may be implemented in a variety of ways. For example, test coverage process 10 may be implemented as a server-side process, a client-side process, or a server-side/client-side process.

For example, test coverage process 10 may be implemented as a purely server-side process via test coverage process 10s. Alternatively, test coverage process 10 may be implemented as a purely client-side process via one or more of client-side application 10c1, client-side application 10c2, client-side application 10c3, and client-side application 10c4. Alternatively still, test coverage process 10 may be implemented as a server-side/client-side process via screen test coverage process 10s in combination with one or more of client-side application 10c1, client-side application 10c2, client-side application 10c3, and client-side application 10c4. In such an example, at least a portion of the functionality of test coverage process 10 may be performed by test coverage process 10s and at least a portion of the functionality of test coverage process 10 may be performed by one or more of client-side application 10c1, 10c2, 10c3, and 10c3.

Accordingly, test coverage process 10 as used in this disclosure may include any combination of test coverage process 10s, client-side application 10c1, client-side application 10c2, client-side application 10c3, and client-side application 10c4.

Figure 2:
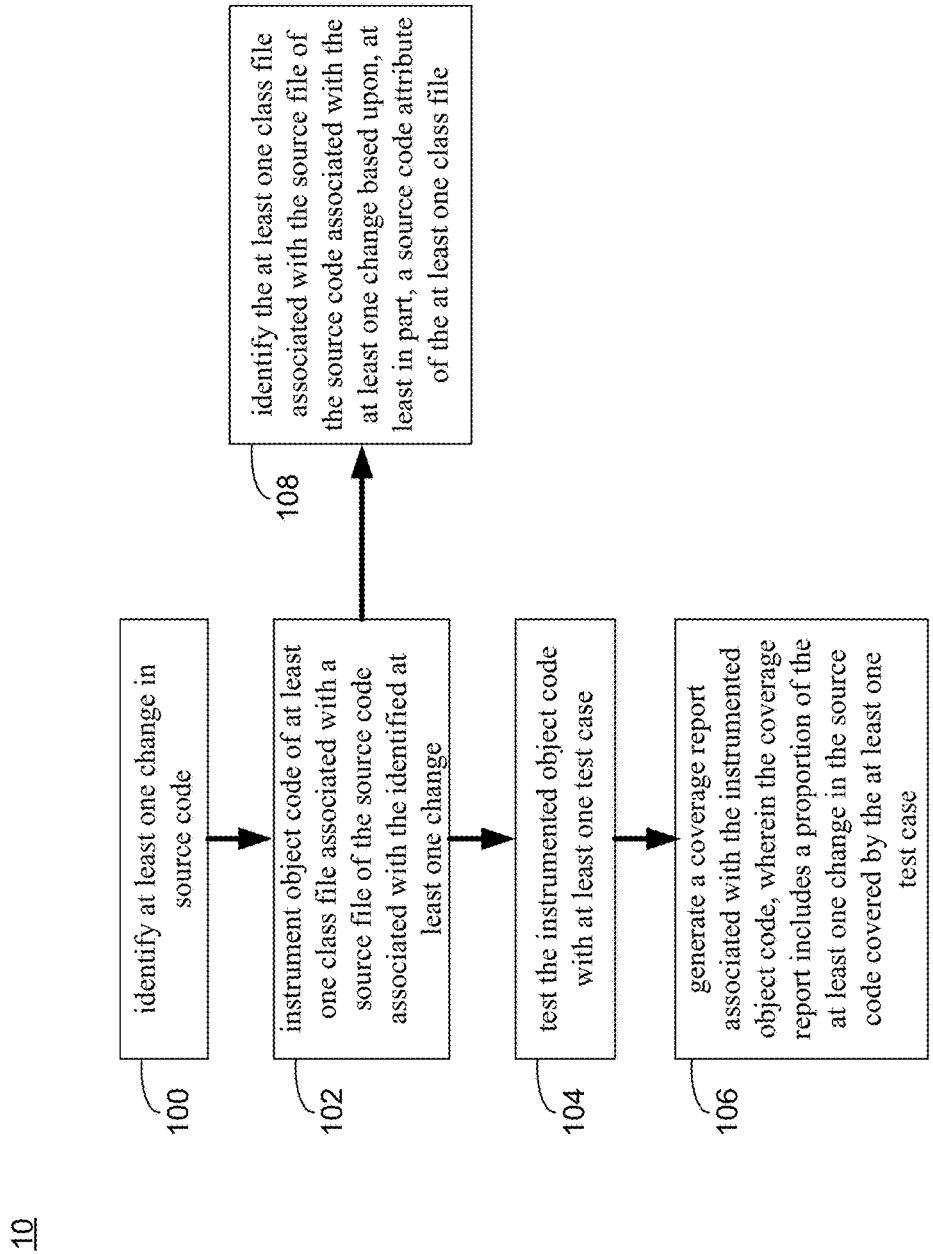
FIG. 2 is a flowchart of the test coverage process of FIG. 1, according to an implementation of the present disclosure.

Referring also to FIG. 2, and as will be discussed in greater detail below, test coverage process 10 may identify 100 at least one change in source code. Test coverage process 10 may also instrument 102 object code of at least one class file associated with a source file of the source code associated with the identified at least one change. Test coverage process 10 may also test 104 the instrumented object code with at least one test case. Test coverage process 10 may also generate 106 a coverage report associated with the instrumented object code, wherein the coverage report includes a proportion of the at least one change in the source code covered by the at least one test case.

Test coverage process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of test coverage process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access test coverage process 10 directly through network 14 or through secondary network 18. Further, test coverage process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, test coverage process 10 may communicate with, interact with, and/or include a component or module of a source control or software version control application (e.g., source control application 54). As is generally known, a source control application (e.g., source control application 54) may generally manage and track changes to software source code. Various changes made to the software source code may be identified and tracked, such that each revision or change to the software source code may be identified. As such, source control application 54 may document and identify changes, or revisions, that are made to the source code of one or more software products, when the changes were made, the nature or impact of such changes, the source code that was changed, as well as various other information. As such, changes to the software (e.g., to the software source code) that take place over time may be documented using source control application 54. Various information in addition to source code changes or revisions may also be documented or tracked by, or using, source control application 54. In an embodiment, the data associated with, generated by, and/or collected by source control application may be stored, e.g., on storage device 16 associated with server computer 12, which executes source control application, and/or another suitable storage device.

As generally discussed above with reference to FIG. 2, test coverage process 10 may identify 100 at least one change in source code. Test coverage process 10 may also instrument 102 object code of at least one class file associated with a source file of the source code associated with the identified at least one change. Test coverage process 10 may also test 104 the instrumented object code with at least one test case. Test coverage process 10 may also generate 106 a coverage report associated with the instrumented object code, wherein the coverage report includes a proportion of the at least one change in the source code covered by the at least one test case.

For example, test coverage process 10 may identify 100 at least one change in source code. Identifying the at least one change in the source code may include identifying the at least one change in the source code based upon, at least in part, a source code history change-set. For example, as changes are made to the source code, the location of each change to the source code may be tracked by a software version control application (e.g., source control application 54). As discussed above, source control application 54 may document and identify changes, or revisions, that are made to the source code of one or more software products, when the changes were made, the nature or impact of such changes, the source code that was changed, as well as various other information. Source control application 54 may track where each change was made in the source code, by file name and line. As such, test coverage process 10 may identify 100 at least one change in source code based upon, at least in part, a source code history change-set, which may be identified using source code application 54. The at least one change may include one or more source code changes that occurred between a given version or release of the software product and a prior version or release of the software product. Test coverage process 10 may identify 100 each change in the source code by line from a particular date and/or time based upon, at least in part, the source code history change-set retrieved from source code application 54.

Identifying 100 the at least one change in the source code may include at least one of identifying 100 at least one new source file and identifying 100 at least one change in an existing source file. For example, a software product may consist of numerous source files with numerous lines of source code. The at least one change in the source code may include a new source file in the source code. For example, as the software product is modified or revised, new source files may be added to the source code. Test coverage process 10 may identify 100 one or more newly added source files (e.g., relative to the prior version of the software product to which the comparison is being made). Additionally/alternatively, the at least one change in the source code may include at least one change or modification of source code in an existing source file. Test coverage process 10 may identify 100 the at least one change in the source code, including at least one of identifying 100 at least one new source file and identifying 100 at least one change in the existing source file.

In an embodiment, test coverage process 10 may instrument 102 object code of at least one class file associated with a source file of the source code associated with the identified 100 at least one change. When source code is compiled, the compiled file may be referred to as object code. Object code may include, but is not limited to, binary files, bytecode, and any other set of instructions in a computer language. A source file may have a class, which may be a construct used to define a distinct data type. If a source file has more than one class, each class may be compiled into separate class files. Each separate class file may include object code. For the purpose of the following description, bytecode may be described as an example of object code, however, this is intended for the purpose of illustration only.

Instrumentation may refer to an ability to monitor or measure the level of a product's performance and diagnose errors. Instrumentation may be used to review performance of a software application. Instrumentation may include, but is not limited to, code tracing, debugging, performance counters, data logging, code coverage, and any other functionality to monitor and track performance of a product or application. Some types of instrumentation may cause an increase in execution time.

For example, test coverage process 10 may instrument 102 bytecode of at least one class file associated with a class of a source file. Furthering this, test coverage process 10 may instrument 102 bytecode of at least one class file associated with a class of a source file of the source code associated with the identified 100 at least one change. That is, test coverage process 10 may instrument 102 bytecode of a class file associated with a class associated with a source file that includes the at least one change, such that test coverage process 10 may instrument 102 bytecode associated with sections of the source code that have been changed, based upon, at least in part, the source code history change-set. Accordingly, in an embodiment, object code associated with one or more changes to the software product may be instrumented, thereby measuring a level of performance and/or errors associated with and/or resulting from the one or more changes to the software product.

Test coverage process 10 may identify 108 the at least one class file associated with the source file of the source code associated with the at least one change based upon, at least in part, a source code attribute of the at least one class file. As previously discussed, each class included within a source file may be compiled into separate class files. Each compiled class file may include a source file attribute. A source file attribute may indicate a name of the source file from which the class file was compiled. As such, test code coverage 10 may identify 108 the at least one class file associated with the source file of the source code associated with the at least one change by comparing a name of the source file associated with the at least one change in the source code based upon, at least in part, the source code history change-set to the source code attribute of each class file. That is, for each source file that has been changed, test code coverage 10 may compare the name of the source file to the source code attribute of each class file to identify 108 the at least one class file associated with the source file of the source code associated with the at least one change in the source code.

In an embodiment, instrumenting 102 the object code of the at least one class file associated with the source file of the source code associated with the identified 100 at least one change may include, if the at least one change in the source code includes a new source file, instrumenting 102 the object code associated with the at least one class file associated with the new source file. As previously described, a source file may include more than one class, which, when compiled, may generate a separate class file for each class. In the case where a new source file exists based upon, at least in part, the identified 100 at least one change in the source code based upon, at least in part, a source code history change-set, test coverage process 10 may identify 108 the at least one class file associated with the new source file of the source code associated with the at least one change and instrument 102 bytecode associated with each class file associated with the new source file.

In an embodiment, instrumenting 102 the object code of the at least one class file associated with the source file of the source code associated with the identified 100 at least one change may include, if the at least one change in the source code includes at least one change in an existing source file, instrumenting 102 the object code associated with the at least one class file associated with the at least one change in the existing source file. In the case where at least one change has been made to an existing source file based upon, at least in part, the identified 100 at least one change in the source code based upon, at least in part, a source code history change-set, test coverage process 10 may identify 108 the at least one class file associated with the existing source file of the source code associated with the at least one change and instrument 102 bytecode associated with each class file associated with the at least one change in the existing source file.

Instrumenting 102 bytecode associated with each class file associated with the at least one change in the existing source file may include partially instrumenting the at least one class file. Partially instrumenting the at least one class file may include test coverage process 10 identifying 108 a class file associated with the at least one change in the existing source file by matching a name of the existing source file including the at least one change with a source code attribute of the class file. Once identified, test coverage process 10 may parse the identified class file to locate a specific location of the bytecode in the class file that corresponds to the at least one change of the existing source file. This information may be included in a line number table attribute which may be included in the class file. Once identified, test coverage process 10 may instrument 102 the bytecode of the class file at the location corresponding to the at least one change of the existing source file.

Instrumenting 102 the object code of the at least one class file associated with the source file of the source code associated with the at least one change may include inserting a counter into the object code of the at least one class file associated with the source file of the source code associated with the identified at least one change. That is, for each class file associated with a new source file, test coverage process 10 may insert a counter into a portion of the instructions of the bytecode corresponding to the at least one change of the source code. A counter may be inserted into portions of the object code that correspond to each line of a source file that has been changed or created. For example, a counter may be inserted into the portions of the instructions of the bytecode corresponding to a new source file. Further, a counter may be inserted into the portions of the instructions of the bytecode that correspond to each line of the new source file. In yet another example, a counter may be inserted into the portions of the instructions of the bytecode that correspond to at least one change of an existing source file. Further, a counter may be inserted into the portions of the instructions of the bytecode that correspond to each line of the at least one change of the existing source file. The counter may indicate that the portion of the instructions of the bytecode that correspond to lines of the source code in the new source file or existing source file have been executed. The counter may be increased for each time that portion of the instructions of the bytecode are executed.

Test coverage process 10 may test 104 the instrumented 102 object code with at least one test case. Test cases may generally be used to test at least a portion of source code to ensure that the source code is executed and functions properly. Test coverage process 10 may test 104 the instrumented bytecode of the at least one class file with at least one test case to test whether portions of the corresponding source files are being properly tested.

In an embodiment, test coverage process 10 may generate 106 a coverage report associated with the instrumented object code, wherein the coverage report may include a proportion of the at least one change in the source code covered by the at least one test case. For example, the coverage report may indicate which portions of the at least one change in the source code have test coverage based upon, at least in part, the at least one test case. In other words, the coverage report may indicate whether portions of the at least one change in the source code have been tested.

The coverage report may include a percentage of the at least one change in the source code that has been tested. Additionally, the coverage report may include which portions of the at least one change in the source code has been tested and which portions have not been tested.

In some embodiments, test coverage process 10 may identify 100 at least one change in source code and instrument 102 object code of at least one class file associated with a source file of the source code associated with the identified 100 at least one change. As described above, test coverage process 10 may instrument 102 the object code of the at least one class file associated with the source file of the source code associated with the identified 100 at least one change, including at least one of a new source file and at least one change in an existing source file. That is, test coverage process 10 may instrument 102 object code of at least one class file associated with a new source file or at least one change in an existing source file. Furthermore, test coverage process 10 may instrument 102 object code of at least one class file associated with both a new source file and at least one change in an existing source file. In this manner, test coverage process 10 may exclude any unchanged code from being instrumented, thus increasing performance for testing 104 the source code.

Figure 3:
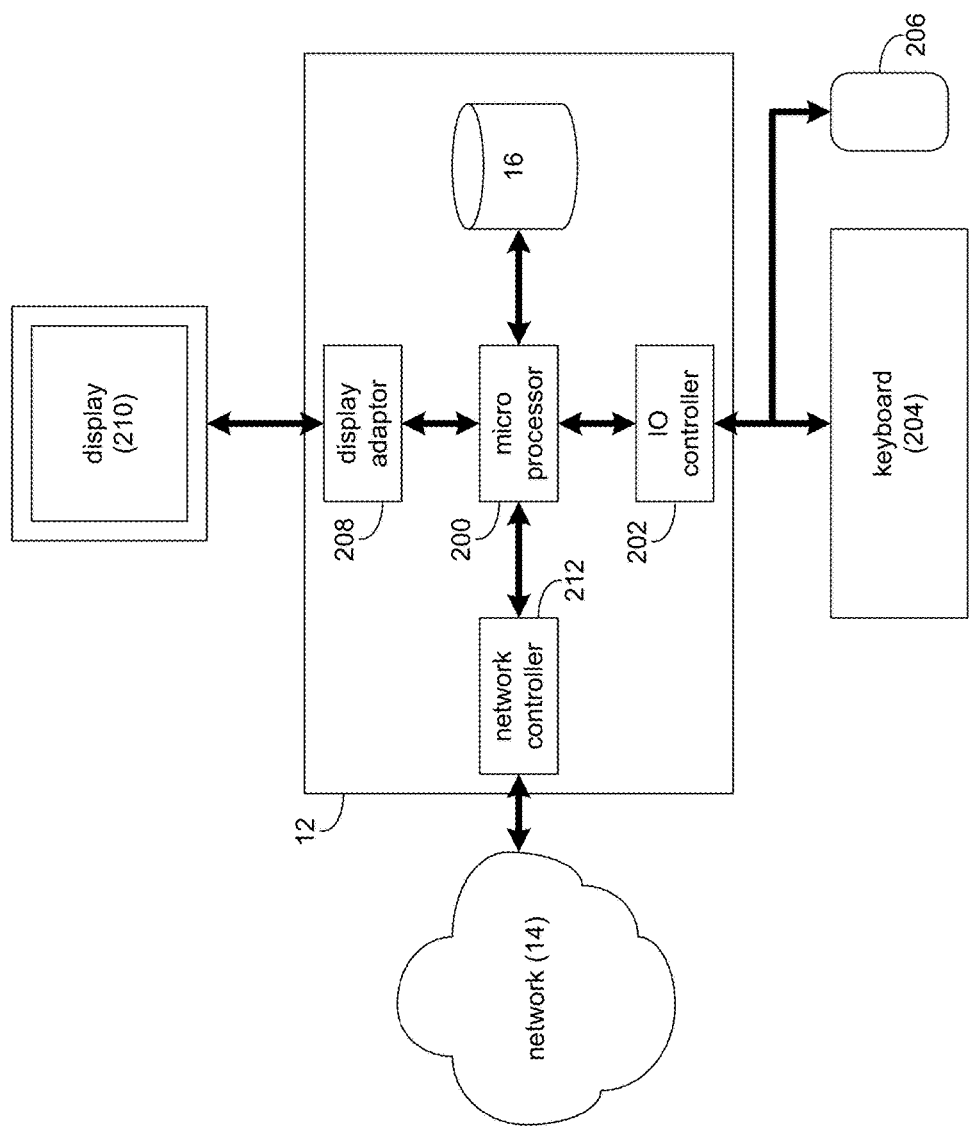
FIG. 3 is a diagrammatic view of the computing device of FIG. 1, according to an implementation of the present disclosure.

Referring also to FIG. 3, there is shown a diagrammatic view of computing system 12. While computing system 12 is shown in this figure, this is for illustrative purposes only and is not intended to be a limitation of this disclosure, as other configurations are possible. For example, any computing device capable of executing, in whole or in part, test coverage process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a non-transitory computer readable medium having a plurality of instructions stored thereon, which, when executed by a processor, cause the processor to perform operations including:
    identifying at least one change in source code, wherein the at least one change in source code includes a new source file;
    identifying at least one class file associated with the new source file of the source code associated with the at least one change;
    identifying object code of the at least one class file associated with a source file of the source code associated with the identified at least one change, wherein the object code of at least one class file is a compiled file of the source code;
    instrumenting the object code of at the least one class file associated with the source file of the source code associated with the identified at least one change, including instrumenting bytecode associated with each of the at least one class file associated with the new source file;
    excluding unchanged object code associated with the source code from instrumentation;
    inserting a counter into the object code of the at least one class file associated with the source file of the source code associated with the identified at least one change, wherein the counter is increased each time a portion of an instruction associated with the object code is executed;
    testing the instrumented object code with at least one test case; and
    generating a coverage report associated with the instrumented object code, wherein the coverage report includes a proportion of the at least one change in the source code covered by the at least one test case.

2. The computer program product of claim 1, wherein identifying the at least one change in the source code includes identifying the at least one change in the source code based upon, at least in part, a source code history change-set.

3. The computer program product of claim 1, wherein the at least one change in the source code includes at least one of the new source file and at least one change in an existing source file.

4. The computer program product of claim 3, further including:
    identifying the at least one class file associated with the source file of the source code associated with the at least one change based upon, at least in part, a source code attribute of the at least one class file.

5. The computer program product of claim 4, wherein instrumenting the object code of the at least one class file associated with the source file of the source code associated with the identified at least one change further includes:
    instrumenting the object code associated with the at least one class file associated with the at least one change in the existing source file.

6. A system comprising:
    at least one processor device and at least one memory architecture coupled with the at least one processor device, the at least one processor device configured for:
    identifying at least one change in source code, wherein the at least one change in source code includes a new source file;

identifying at least one class file associated with the new source file of the source code associated with the at least one change;

identifying object code of the at least one class file associated with a source file of the source code associated with the identified at least one change, wherein the object code of at least one class file is a compiled file of the source code;

instrumenting the object code of at the least one class file associated with the source file of the source code associated with the identified at least one change, including instrumenting bytecode associated with each of the at least one class file associated with the new source file;

excluding unchanged object code associated with the source code from instrumentation;

inserting a counter into the object code of the at least one class file associated with the source file of the source code associated with the identified at least one change, wherein the counter is increased each time a portion of an instruction associated with the object code is executed;

testing the instrumented object code with at least one test case; and generating a coverage report associated with the instrumented object code, wherein the coverage report includes a proportion of the at least one change in the source code covered by the at least one test case.

7. The system of claim 6, wherein identifying the at least one change in the source code includes identifying the at least one change in the source code based upon, at least in part, a source code history change-set.

8. The system of claim 6, wherein the at least one change in the source code includes at least one of the new source file and at least one change in an existing source file.

9. The system of claim 8, further including:

identifying the at least one class file associated with the source file of the source code associated with the at least one change based upon, at least in part, a source code attribute of the at least one class file.

10. The system method of claim 9, wherein instrumenting the object code of the at least one class file associated with the source file of the source code associated with the identified at least one change further includes:

instrumenting the object code associated with the at least one class file associated with the at least one change in the existing source file.

* * * * *